(12) United States Patent
Burnside et al.

(10) Patent No.: US 6,297,923 B1
(45) Date of Patent: Oct. 2, 2001

(54) DISK-CARTRIDGE DETECTION SYSTEM INCORPORATING AN ANGLED LIGHT EMITTER/DETECTOR

(75) Inventors: Michael C. Burnside, South Weber; Dale E. Lee, Sandy, both of UT (US)

(73) Assignee: Iomega Corporation, Roy, UT (US)

( * ) Notice: Subject to any disclaimer, the term of this patent is extended or adjusted under 35 U.S.C. 154(b) by 0 days.

(21) Appl. No.: 09/191,877

(22) Filed: Nov. 13, 1998

(51) Int. Cl.[7] .................................................. G11B 15/18
(52) U.S. Cl. ................................ 360/69; 360/60; 360/133
(58) Field of Search ................................... 360/60, 69, 71, 360/132, 133; 369/54

(56) References Cited

U.S. PATENT DOCUMENTS

| | | | |
|---|---|---|---|
| 3,718,078 | 2/1973 | Plummer | 95/49 |
| 3,727,045 | 4/1973 | Warren et al. | 246/169 A |
| 3,995,376 | 12/1976 | Kimble et al. | 35/25 |
| 4,080,899 | 3/1978 | Luban | 102/42 R |
| 4,102,059 | 7/1978 | Kimble et al. | 35/25 |
| 4,244,683 | 1/1981 | Rowland | 425/143 |
| 4,332,847 | 6/1982 | Rowland | 428/156 |
| 4,498,882 | 2/1985 | Evert | 441/116 |
| 4,578,042 | 3/1986 | Evert | 441/117 |
| 4,592,554 | 6/1986 | Gilbertson et al. | 273/312 |
| 4,607,978 | 8/1986 | Eigenmann | 404/73 |
| 4,633,451 | 12/1986 | Ahn et al. | 369/14 |
| 4,649,264 | 3/1987 | Carson | 235/54 |
| 4,652,172 | 3/1987 | Eigenmann | 404/73 |
| 4,683,824 | 8/1987 | Gibbs | 102/436 |
| 4,783,672 | 11/1988 | Wirtz et al. | 354/21 |
| 5,038,359 | 8/1991 | Pepper et al. | 372/99 |
| 5,069,577 | 12/1991 | Murphy | 404/11 |
| 5,084,883 | 1/1992 | Khalid et al. | 372/24 |
| 5,159,560 | 10/1992 | Newell et al. | 364/479 |
| 5,206,869 | 4/1993 | Khalid et al. | 372/24 |
| 5,325,243 | 6/1994 | Rath et al. | 360/71 |
| 5,491,586 | 2/1996 | Phillips | 359/530 |
| 5,638,228 | 6/1997 | Thomas, III | 360/60 |
| 5,650,891 | 7/1997 | Thayne et al. | 360/99.06 |
| 6,091,563 | * 7/2000 | Thomas, III et al. | 360/69 |
| 6,097,562 | 8/2000 | Thomas, III | 360/60 |

FOREIGN PATENT DOCUMENTS

| | | |
|---|---|---|
| 2135059 | 1/1973 | (DE) . |
| 61650 | 2/1992 | (JP) . |
| 167286 | 6/1992 | (JP) . |
| 168540 | 6/1994 | (JP) . |

OTHER PUBLICATIONS

Patent Abstracts of Japan, Apr. 30, 1996, 096(004), JP 07 334920A, published Dec. 22, 1995, 1 page.

(List continued on next page.)

*Primary Examiner*—Andrew L. Sniezek
(74) *Attorney, Agent, or Firm*—Woodcock Washburn Kurtz Mackiewicz & Norris LLP (57) ABSTRACT

A disk drive has an improved ability to detect the presence of a disk cartridge inserted into the drive. The improved disk drive comprises a source of irradiance and a detector of irradiance. When a disk cartridge is inserted into the drive, the detector is optically connected to the source of irradiance by a reflective marker on the cartridge. The emitting surface of the source is oriented such that the irradiance strikes the reflective marker at an angle substantially less than 90 degrees. The detector surface which receives the reflected irradiance is oriented in a manner similar to the emitting surface. This detection system exploits the relatively unique characteristic of certain reflective markers to reflect light in a direction opposite the incident path when the angle of incidence with the reflecting surface is substantially less than 90 degrees.

16 Claims, 11 Drawing Sheets

OTHER PUBLICATIONS

Jacobs, S.F., "Experiments with retrodirective arrays", *Optical Eng.*, 1982, 21, 281–283.

Rennilson, J., "Retroflection—What is it and how is it used", *ASTM Stand. News*, 1982.

Sugawara, Patent abstracts of Japan, 18, Feb. 10, 1994, Appl. No. 4–113,999.

Venable, W.H. et al., "Factors affecting the metrology of retroreflecting materials", *App. Optics*, 1980, 19, 1242–1246.

Walker, J., "The amateur Scientist: Wonders with the retroreflector, a mirror that removes distortion from a light beam", *Scientific Am.*, 1988, 258, 118–123.

* cited by examiner

| Test Disk Description | Current (µA) Trial 1 | Current (µA) Trial 2 | Current (µA) Trial 3 | Current (µA) Trial 4 | Current (µA) Trial 5 |
|---|---|---|---|---|---|
| Normal RR1 | 24.1 | 24.0 | 23.9 | 24.1 | 24.0 |
| Normal RR2 | 24.1 | 24.2 | 24.1 | 24.1 | 24.1 |
| Normal RR3 | 24.0 | 23.9 | 24.0 | 24.0 | 24.0 |
| Normal RR4 | 24.1 | 24.1 | 24.1 | 24.1 | 24.0 |
| Normal RR5 | 24.1 | 24.1 | 24.2 | 24.1 | 24.1 |
| Normal RR6 | 24.2 | 24.1 | 24.2 | 24.1 | 24.2 |
| Worst-Case RR | 24.0 | 24.0 | 24.1 | 24.0 | 23.9 |
| Lightly Scratched RR | 24.1 | 24.1 | 23.9 | 24.0 | 23.9 |
| Medium Scratched RR | 23.0 | 23.0 | 23.1 | 23.0 | 23.2 |
| Heavily Scratched RR | 22.5 | 22.8 | 22.6 | 22.8 | 22.4 |
| Mylar 1 | 6.0 | 5.1 | 4.8 | 4.7 | 4.7 |
| Mylar 2 | 3.6 | 4.0 | 4.7 | 4.2 | 3.6 |
| Blue Paper | 9.0 | 8.9 | 8.9 | 9.0 | 9.1 |
| Yellow Paper | 8.6 | 8.6 | 8.2 | 8.5 | 8.7 |
| Beige Paper | 9.8 | 9.6 | 9.7 | 9.9 | 10.0 |
| White Paper | 10.1 | 9.9 | 10.0 | 10.1 | 10.1 |
| Small Silver | 14.1 | 14.4 | 14.2 | 14.2 | 14.3 |
| Large Silver | 15.2 | 15.5 | 15.3 | 15.4 | 15.8 |

DISK-CARTRIDGE DETECTION SYSTEM INCORPORATING AN ANGLED LIGHT EMITTER/DETECTOR

BACKGROUND OF THE INVENTION

The present invention relates to an improved apparatus and method for determining whether a suitable data storage cartridge has been inserted into a disk drive, thereby protecting the drive against damage due to the insertion of disk cartridges and foreign objects that are unacceptable for use in the drive.

Removable disk cartridges for storing digital electronic information typically comprise an outer casing or shell that houses a rotatable recording medium, or disk, upon which electronic information can be stored. The cartridge shell often comprises upper and lower halves that are joined together to house the disk. The disk is mounted on a hub that rotates freely within the shell. When the cartridge is inserted into a disk drive, a spindle motor engages the disk hub in order to rotate the disk. The outer shell of the cartridge typically has some form of opening near its forward edge to provide the recording heads of the drive with access to the recording surface of the disk. A shutter or door mechanism is often provided to cover the opening when the cartridge is not in use, thereby preventing dust or other contaminants from entering the cartridge and settling on the recording surface of the disk. The term "disk cartridge," as used in this application, refers to any data storage device, including tape cartridges.

The actuator that carries the recording heads of the disk drive across the recording surface of the disk should not be allowed to move unless the presence of a disk cartridge with an appropriate form factor, i.e., geometry, is detected. Movement of the actuator where a foreign object or a disk with an inappropriate form factor has been inserted will likely damage the drive or corrupt the data stored on the disk. Thus, when a data-storage cartridge is inserted into a drive, it is critical that the type of cartridge be recognized by the drive as a cartridge that is suitable for safe and reliable use in that particular drive. Most removable cartridge drives use cartridges having similar form factors. Additionally, foreign objects are easily inserted into disk drives. Therefore, disk drives that receive removable disk cartridges must have some mechanism for detecting the insertion or presence of a suitable cartridge within the drive. This mechanism must also be able to discriminate between cartridges appropriate for use in the drive, disks which are not suitable for the drive, and foreign objects.

In the prior art, mechanical switches are typically employed to detect the presence of a disk cartridge. Such switches are often positioned such that when a disk cartridge is fully inserted into a drive, the cartridge contacts the switch and thereby produces an indication that the cartridge is present.

Disk detection systems utilizing reflective materials have been developed and patented. For example, U.S. Pat. No. 5,638,228 ("the '228 patent"), which issued on Jun. 10, 1997, discloses such a system. The '228 patent is hereby incorporated by reference. This patent describes a disk cartridge comprising a reflective marker. The patent also describes a disk drive comprising a light emitter and a light detector coupled to an electrical circuit. When the disk cartridge is inserted into the drive, the emitter and detector become optically coupled by via the reflective marker. This coupling causes an increase in the amount of irradiance reaching the detector, which in turn causes a change in the electrical output of the detector.

As described in the '228 patent, the amount of light reflected by a reflector-equipped cartridge is greater than the amount reflected by most other objects. Therefore, by sensing that the light reflected from an object inserted into a disk drive exceeds a predetermined threshold, the detector and electrical circuit can recognize that a disk cartridge with a reflective marker has been inserted. The electronic circuit will permit activation of the drive's read/write heads under these conditions, thereby allowing the drive to interface with the disk cartridge. Conversely, when the intensity of the reflected light does not exceed the predetermined threshold, the electronic circuit interprets this as indication that a suitable data. cartridge is not present in the drive. The electrical circuit will not enable the heads under this condition, thereby preventing the drive from operating.

The emitter/detector described in the '228 patent has proven to be effective in identifying the presence of disks appropriate for use in a particular disk drive. Under certain limited circumstances, however, the '228 design allows activation of the drive in the presence of disks and foreign objects that may damage the drive. Such activation occurs because objects having surface reflectivities similar to or greater than that of a reflector are interpreted by the '228 design as disks appropriate for use in the drive. Hence, there is a need to provide a greater degree of differentiation between disks appropriate for use in a particular drive, and disks and other objects that can damage the drive if inserted.

SUMMARY OF THE INVENTION

The present invention comprises a disk-detection system that provides improved discrimination between objects suitable and unsuitable for use in a particular disk drive. The invention comprises a light emitter and a light detector. These components are used in conjunction with a data-storage cartridge equipped with a reflective marker. The emitter is oriented such that the light generated by the emitter strikes the surface of the marker an angle substantially less than 90 degrees. The detector is located directly adjacent to the emitter, and is oriented in a manner similar to that of the emitter.

The noted improvement in object differentiation stems from the fact that certain surfaces possess the relatively unique ability to reflect light back along its incident path when the incident angle is substantially less than 90 degrees ("incident path" refers to the path of the incident light at it travels toward the reflecting surface; "incident angle" is the angle at which incident light strikes the reflecting surface). Hence, when a cartridge comprising such a surface is inserted into a disk drive that incorporates an emitter and detector oriented in the above-noted manner, the detector will be illuminated by light reflected from that surface. Conversely, when most other objects are inserted into such a drive, most or all of the light incident upon the object will be reflected in directions other than the incident direction. Hence, the detector will not register a change in output voltage under such conditions, and the electrical circuitry in the drive will not allow activation of the drive.

In a preferred embodiment of the invention, a data-storage cartridge is equipped with a retro-reflective marker comprising a plurality of reflective panels. Each reflective panel is angled in relation to the top and bottom surfaces of the marker, i.e., the surfaces of the marker that lie flush with the surrounding cartridge structure. In the preferred embodiment, a portion of the emitter is angled such that the emitted light strikes some of the reflective panels at an angle of about 90 degrees. More specifically, the angle between the light-emitting surface of the emitter and the bottom surface of the cartridge is matched with the angle between the reflective panels and the top surface of the marker. This geometry disposes the light-emitting surface and a plurality of the reflective panels in substantially parallel planes.

The noted geometrical configuration results in an optimal reflection along the light's incident path, i.e., back toward the detector. Hence, when a cartridge equipped with a retro-reflective marker is installed in the exemplary drive, the detector will be illuminated by a relatively strong reflection from the marker. Conversely, when an object that is not equipped with a retro-reflective marker is placed in the drive, any reflection along the incident path will, in general, be low or non-existent. Thus, an activation threshold that prohibits the drive from operating in the presence of most foreign objects and incompatible data cartridges can be programmed into the drive's electrical circuitry, thereby protecting the drive from potential damage caused by such operation.

BRIEF DESCRIPTION OF THE DRAWINGS

The foregoing summary, as well as the following detailed description of the preferred embodiments, is better understood when read in conjunction with the appended drawings. For the purposes of illustrating the invention, there is shown in the drawings an embodiment that is presently preferred, it being understood, however, that the invention is not limited to the specific methods and instrumentalities disclosed. In the drawings:

FIG. 8a is a diagrammatical view showing the incident and reflected paths of light between the emitter/detector pair of FIGS. 7a through 7d and an object which is not equipped with a retroactive marker;

DESCRIPTION OF THE PREFERRED EMBODIMENTS

Throughout this description, the invention is described with reference to a particular data-storage cartridge. Such a cartridge is described in commonly-assigned U.S. Pat. No. 5,650,891 entitled "Apparatus for Performing Multiple Functions in a Data Storage Device Using a Single Electro-Mechanical Device," issued on Jun. 22, 1997, which is hereby incorporated by reference. This particular cartridge is used for exemplary purposes only, however, as the invention also applies to data-storage cartridges of other sizes and shapes.

Figure 1:
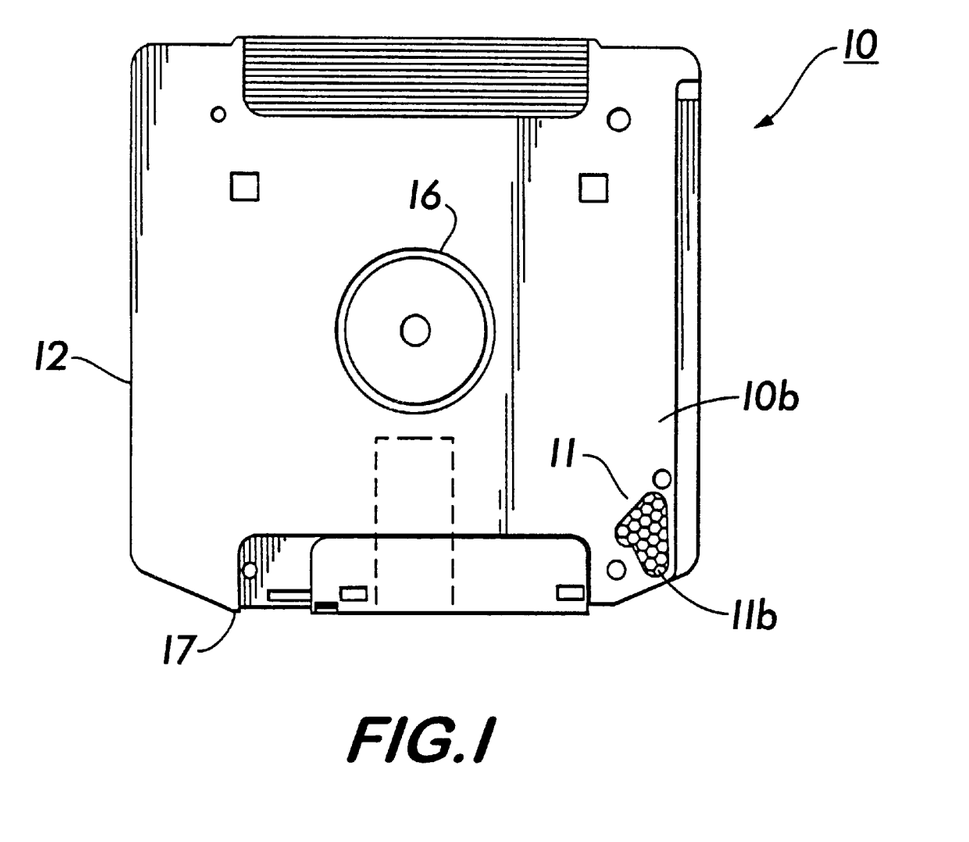
FIG. 1 shows a data-storage cartridge that can be used with disk drives employing the invention.

FIG. 1 illustrates a data-storage cartridge 10 that is capable of use in accordance with the present invention. Cartridge 10 comprises an outer casing 12 having upper and lower shells that mate to form the casing. Cartridge 10 also comprises a disk-shaped recording medium 13 affixed to a disk hub 16. Medium 13 and hub 16 are rotatably mounted within outer casing 12. An opening on the bottom shell of casing 12 provides access to hub 16. An opening in the front peripheral edge 17 of disk cartridge 10 provides access to medium 13.

Data-storage cartridge 10 further comprises a marker 11. Marker 11 is mounted in cartridge 10 in a manner that causes a bottom surface 11b of marker 11 to lie substantially flush with a bottom surface 10b of cartridge 10. Preferably, marker 11 is a retro-reflective marker made from a material such as Reflexite. More preferably, marker 11 is a retro-reflective marker comprising an array of corner cubes 35, as illustrated in FIGS. 2 through 5a.

Figure 2:
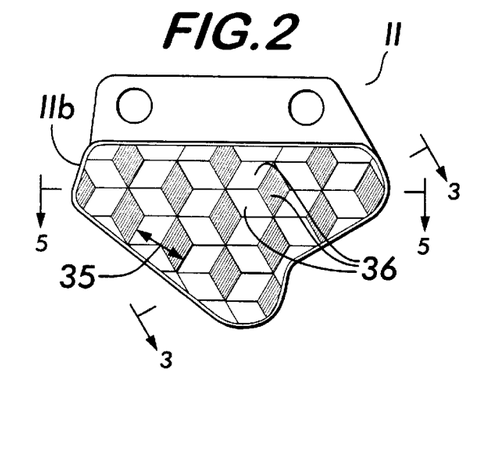
FIG. 2 is a plan view of the front surface of a retro-reflective marker suitable for use on the data-storage cartridge of FIG. 1.
Figure 2A:
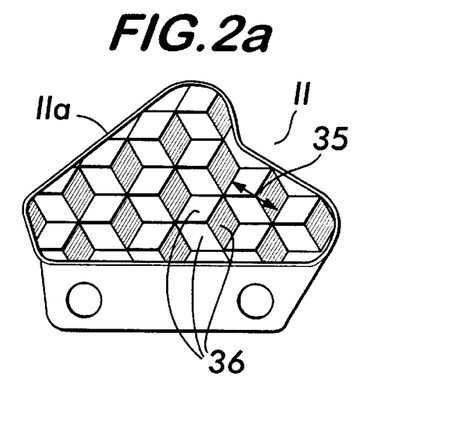
FIG. 2a is a plan view of the back surface of the retro-reflective marker of FIG. 2.
Figure 3:
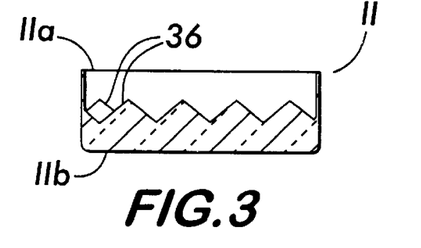
FIG. 3 is a cross-sectional view along the section line 3—3 of FIG. 2.
Figure 4:
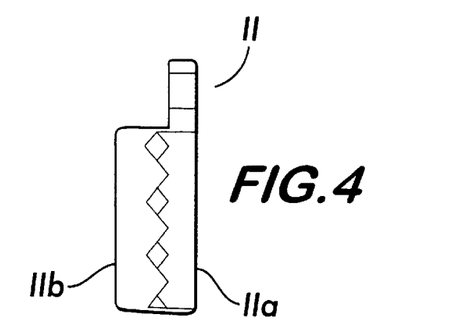
FIG. 4 is an edge view of the retro-reflective marker of FIG. 2.
Figure 5:
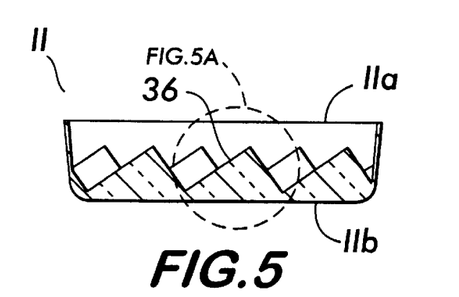
FIG. 5 is a cross-sectional view along the section line 5—5 of FIG. 2.
Figure 5A:
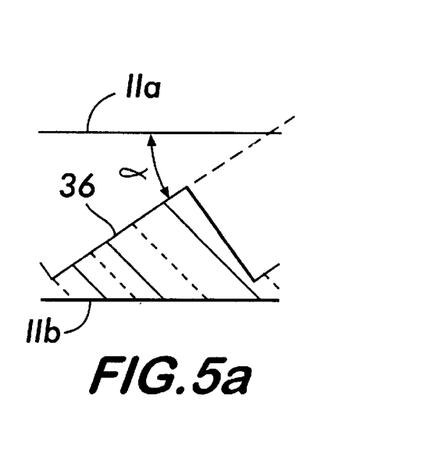
FIG. 5a is magnified view of the area 5a of FIG. 5.

Each corner cube 35 comprises a plurality of flat, reflective panels 36, as shown in FIGS. 2 and 2a. A set of similarly-oriented panels 36 are selectively shaded in FIGS. 2 and 2a for illustrative purposes. Corner cubes 35 are oriented such that each panel 36 lies in a plane that forms an acute angle with a "back" surface 11a of marker 11, i.e., the surface of marker 11 that faces cartridge 10. This angle is referred to throughout this specification as the "pitch angle" ($\alpha$) of corner cubes 35, and is shown in detail in FIG. 5a. Preferably, the pitch angle on marker 11 is about 30 degrees.

Figure 6:
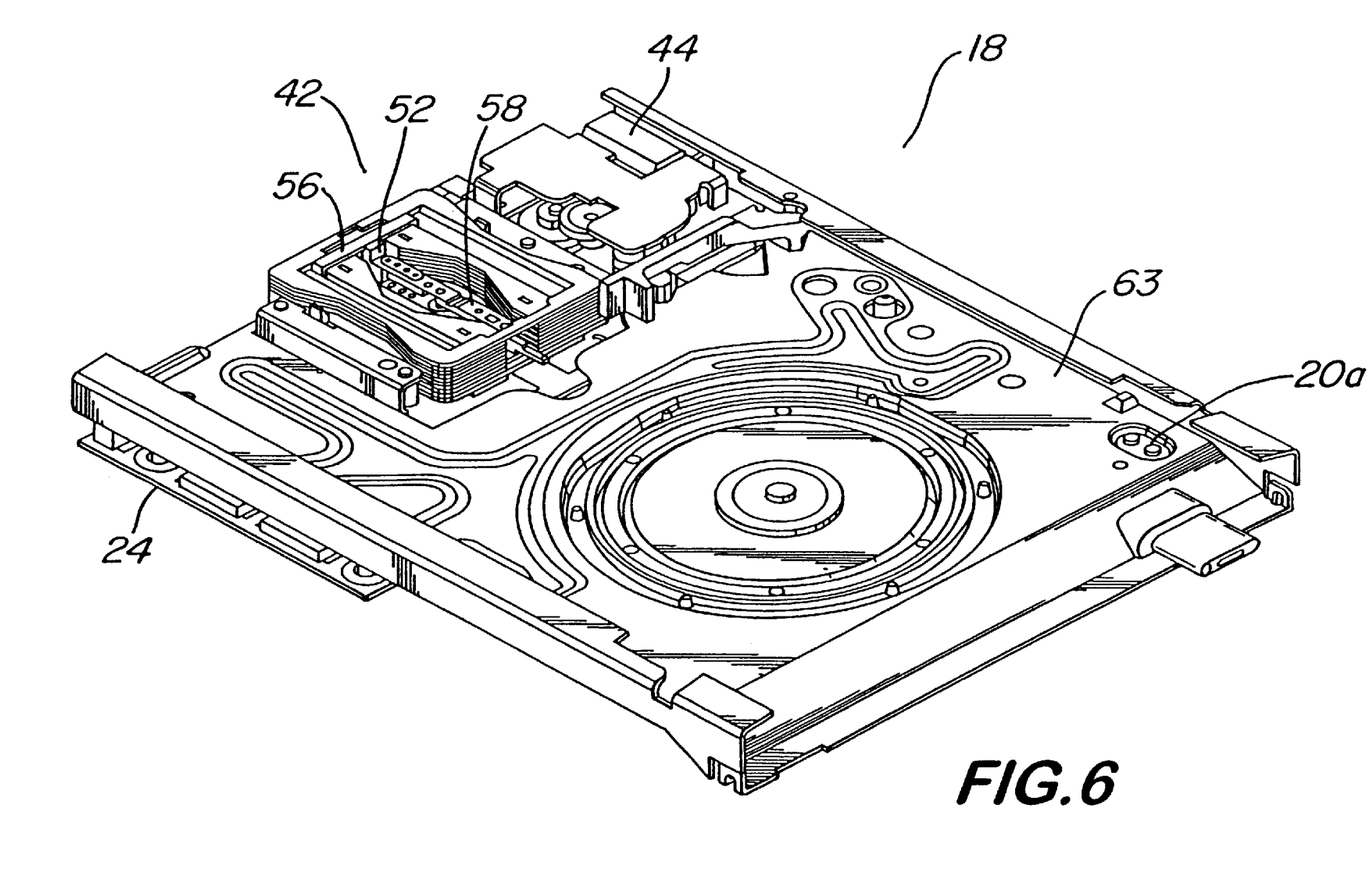
FIG. 6 is an isometric view of a disk drive of the type in which the invention can be used.
Figure 6A:
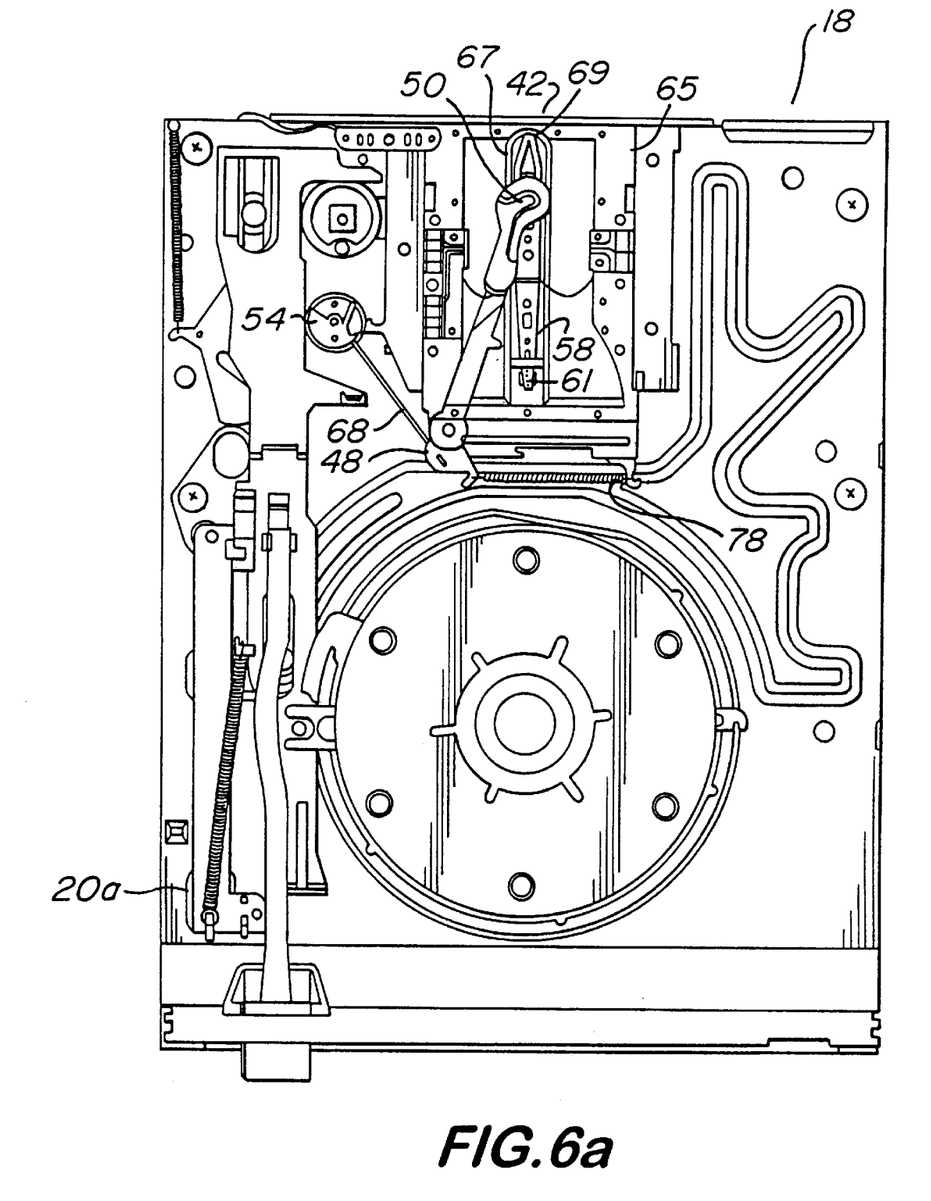
FIG. 6a is a bottom plan view of the disk drive shown in FIG. 6.

FIGS. 6 and 6a illustrate an exemplary disk drive 18 that incorporates various aspects of the invention. Disk drive 18 comprises a detection device 20a and an electrical circuit 20b. Drive 18 also comprises read/write heads 61 which selectively interface with cartridge 10, and a head-retraction system 42. Head-retraction system 42 and other components of disk drive 18 are described in a commonly-assigned, co-pending application entitled "An Improved Operating System For Operating An Eject System And A Head Retraction System Of A Disk Drive," Ser. No. 08/866,189, filed May 30, 1997. This application is hereby incorporated by reference.

Figure 7A:
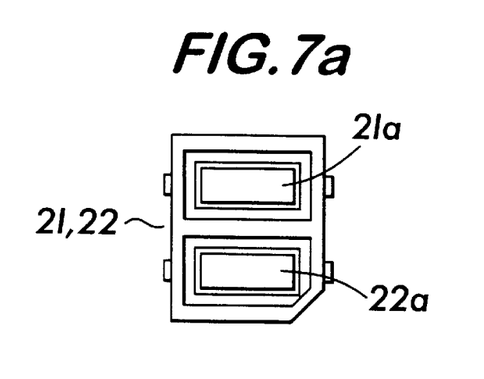
FIGS. 7a and 7b are top and bottom plan views, respectively, of an emitter/detector pair that can be used with the invention.
Figure 7B:
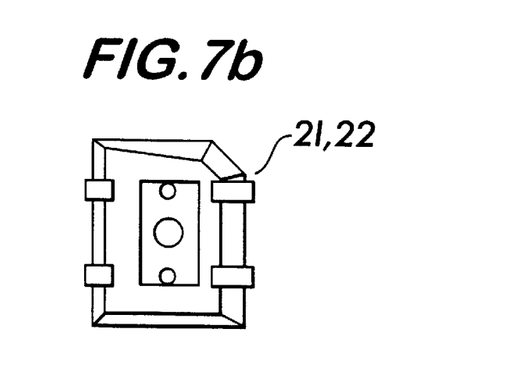
Figure 7C:
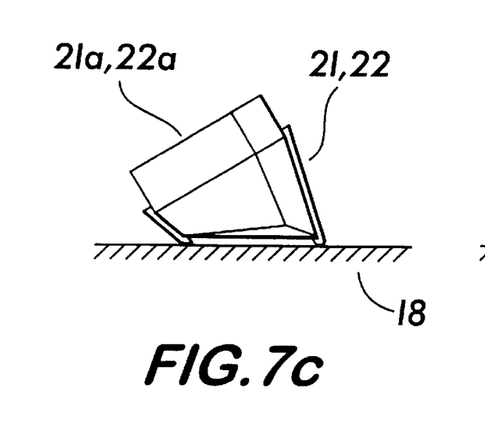
FIGS. 7c and 7d are side plan views of the emitter/detector pair of FIGS. 7a and 7b.
Figure 7D:
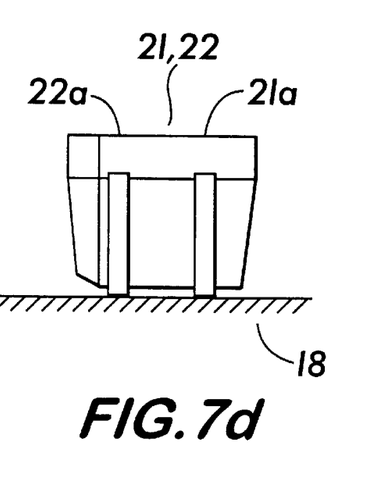
Figure 8A:
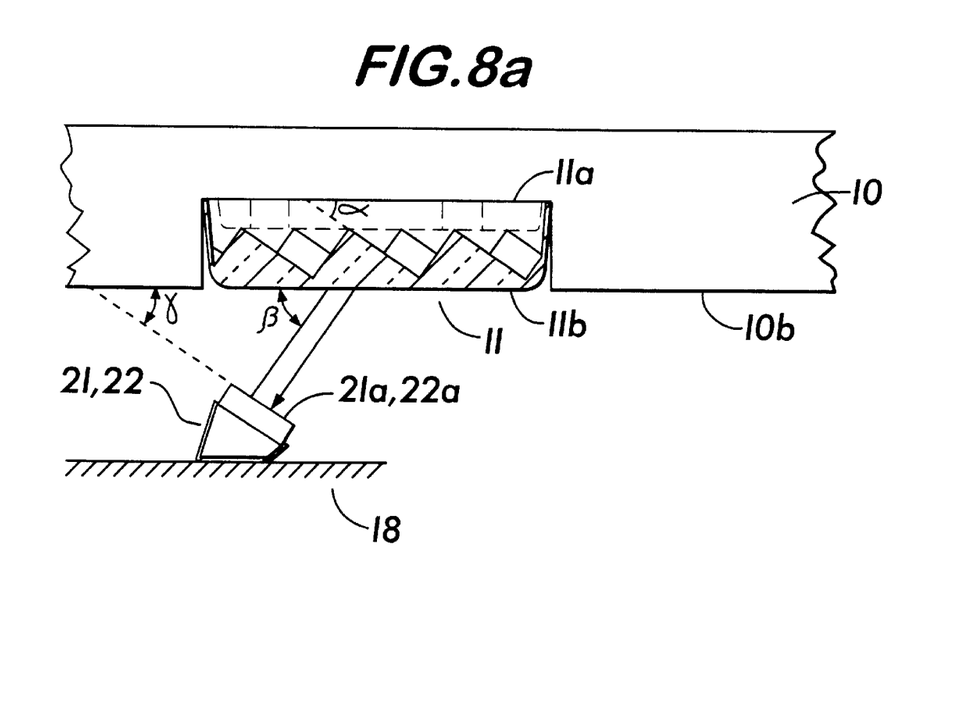
FIG. 8a is a diagrammatical view showing the incident and reflected paths of light between the emitter/detector pair of FIGS. 7a through 7d and the data-storage cartridge of FIG. 1.

Detection device 20a comprises an emitter/detector pair 21, 22. FIGS. 7a and 7b represent top and bottom plan views, respectively, of emitter/detector pair 21, 22. FIGS. 7c and 7d are side views of emitter/detector pair 21, 22. The relative positions of detection device 20a, marker 11, and cartridge 10 within drive 18 are shown in FIG. 8a. A detection device compatible with the present invention is available from Sharp Corporation as Model No. GP4510KHCP.

Emitter/detector pair 21, 22 is positioned in drive 18 to detect the presence of marker 11. Emitter 21 and detector 22 are optically coupled by reflective marker 11 when disk cartridge 10 is inserted in drive 18. As explained in detail below, this coupling causes a change in the electrical output of detector 22, which in turn causes an electrical circuit 20b to unlock read/write heads 61. Once unlocked, heads 61 are able to interface with cartridge 10.

Emitter/detector pair 21, 22 comprise a light-emitting surface 21 a and a light-receiving surface 22a. Surfaces 21a and 22a are angled in relation to the base of detection device 20a, i.e., the surface of device 20a that is mounted to disk drive 18. This relationship is evident in FIGS. 7c, 8a, and 8b. The noted geometry causes surfaces 21a and 22a lie in a plane that forms an acute angle ($\gamma$) with the bottom surface of cartridge 10. This angle is denoted in FIGS. 8a and 8b. Preferably, $\gamma$ is about equal to pitch angle $\alpha$ on marker 11. Hence, for the exemplary embodiment, $\gamma$ is preferably about 30 degrees. Furthermore, the distance between marker 11 and surfaces 21a and 22a is preferably about 10 mm. As explained below, this geometrical configuration allows drive 18 to better discern between objects suitable and unsuitable for use in the drive.

Figure 8B:
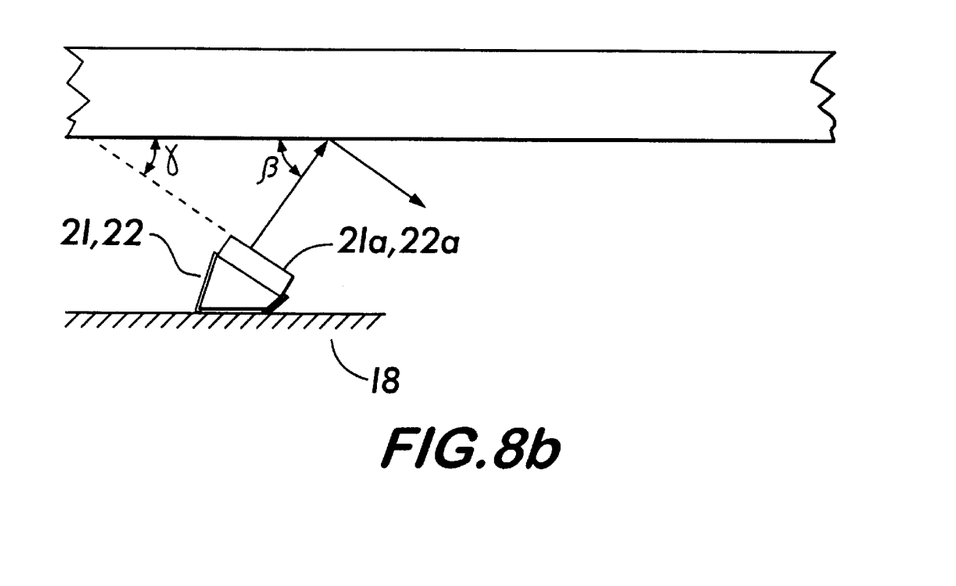
FIG. 8c is a tabular compilation of data showing the response of the detector of FIGS. 7a through 7d to light-rected from various objects, for an incident angle of 30 degrees and an offset distance 10 mm between the emitter/detector and the object.
FIG. 8d is a graphical illustration of the data of FIG. 8c.

The subject invention is based on the principle that most reflective surfaces generate a substantial reflection back along the light's incident path only when the incident angle ($\beta$) is at or near 90 degrees. Incident angle $\beta$ is illustrated in FIGS. 8a and 8b. As $\beta$ decreases from 90 degrees, the intensity of the reflection along the incident path falls off rapidly. Furthermore, most surfaces give off little or no reflection along the incident path when $\beta$ is substantially less than ninety degrees.

Retro-reflective markers present an exception to the above-noted trend. Specifically, certain retro-reflective markers are capable of generating a relatively strong reflection along the incident path when incident angle $\beta$ is substantially less than 90 degrees. For example, marker 11 is particularly effective at reflecting light under such conditions due to the geometry of corner-cubes 35. This effectiveness results from the fact that, as $\beta$ is decreased, the angled orientation of panels 36 causes an increase in the angle at which the incident light strikes some of the individual panels. This increase intensifies the reflection given off by those particular panels along the incident path. This principle is illustrated in FIG. 8a.

Furthermore, the incident light will strike one or more of panels 36 at an angle of about 90 degrees when $\beta$ is about equal to the complement of pitch angle $\alpha$, i.e., when $\alpha$ is about equal to $\gamma$. Reflection along the incident path will reach its maximum under this particular condition, because the panels being illuminated at an angle of about 90 degrees will generate a maximal reflection along the incident path. Hence, the refection generated by marker 11 along the incident path can be maximized by orienting light emitting surface 21a in a manner that causes angle$\gamma$ to equal pitch angle $\alpha$ of marker 11. As can be discerned from FIG. 8a, this configuration results in light emitting surface 21a and a plurality of reflective panels 36 being disposed in substantially parallel planes.

The present invention enhances the ability of drive 18 to discriminate between objects suitable and unsuitable for use in the drive. This enhancement is achieved by exploiting the above-noted reflective characteristics of retro-reflective marker 11. Specifically, by orienting light-emitting surface 21a in the previously described manner, the light generated by emitter 21 strikes surface 11b of marker 11 at an incident angle $\beta$ which is substantially less than 90 degrees. Hence, when a cartridge 10 comprising reflective marker 11 is inserted into drive 18, the reflective characteristics of marker 11 cause the light generated by emitter 21 to be reflected back along the incident path, thereby illuminating detector 22. Furthermore, by orienting light-emitting surface 21a so as to match angle $\gamma$ with pitch-angle $\alpha$ (as in the preferred embodiment), a maximal reflection is generated along the incident path. Additionally, the response of detector 22 is enhanced under these conditions by orienting light-receiving surface 22a at an angle similar to that of light-emitting surface 21a. Orienting surface 22a in this manner maximizes the surface area which is exposed to light reflected back along the incident path, thereby maximizing the response of detector 22 to such light.

The enhanced foreign-object discrimination provided by the present invention stems from the uniqueness of the reflective characteristics of marker 11. Notably, most data-storage cartridges and most objects inadvertently inserted into disk drives possess substantially smooth, uniform surfaces, i.e., the types of surfaces that will not reflect light back along its incident path when incident angle $\beta$ is substantially less than 90 degrees. Hence, when these types of objects are placed in drive 18, the light produced by emitter 21 will not be reflected along the incident path, i.e., back toward detector 22. Thus, the output voltage of detector 22 will not increase, and read/write heads 61 will remain in the locked, or "stored" position under these conditions.

The present invention can therefore prevent inadvertent activation of drive 18 in the presence of objects unsuitable for use in the drive. The invention is particularly effective with regard to objects having surface reflectivities that approach or exceed those of a retro-reflector at incident angles of about ninety degrees, but which fall off substantially as the incident angle is decreased. Hence, among other benefits, the subject invention provides enhanced protection against the potentially damaging activation of drive 18 in the presence of data-storage cartridges and other objects that are unsuitable for use in the drive.

The effectiveness of the present invention has been verified under controlled conditions. Specifically, the output of detector 22 has been measured in the presence of various "test disks" while the angle between the test-disk surface and surfaces 21a and 22a, i.e., angle $\gamma$, was varied. The distance between the test-disk surfaces and surfaces 21a and 22a was also varied during this exercise.

As noted previously, the reflection generated by marker 11 along the incident path is at a maximum when angles $\alpha$ and $\gamma$ are about equal. Data acquired under these conditions is presented in tabular and graphical form in FIGS. 8c and 8d, respectively. More specifically, this data was acquired with $\gamma$ set at about 30 degrees, thereby matching the pitch angle of marker 11. Furthermore, the data was acquired while the distance between surfaces 21a/22a and the test disk surface was about 10 mm. The data presented in the figures represents the output of detector 22 as expressed in micro-amps. Hence, relatively high values represent relatively high responses by the detector, while lower values represent correspondingly lower responses.

Figure 8C:
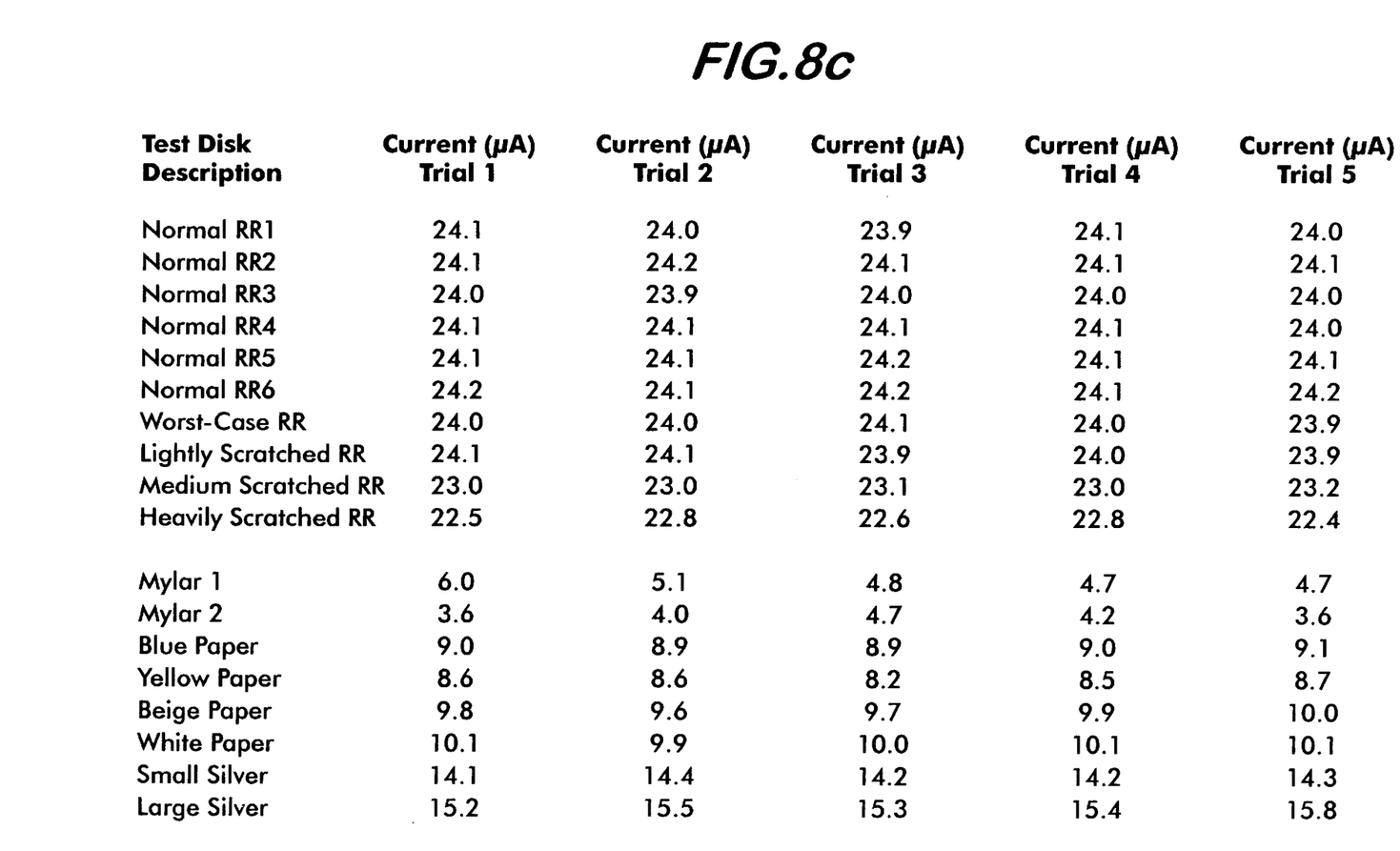
Figure 8D:
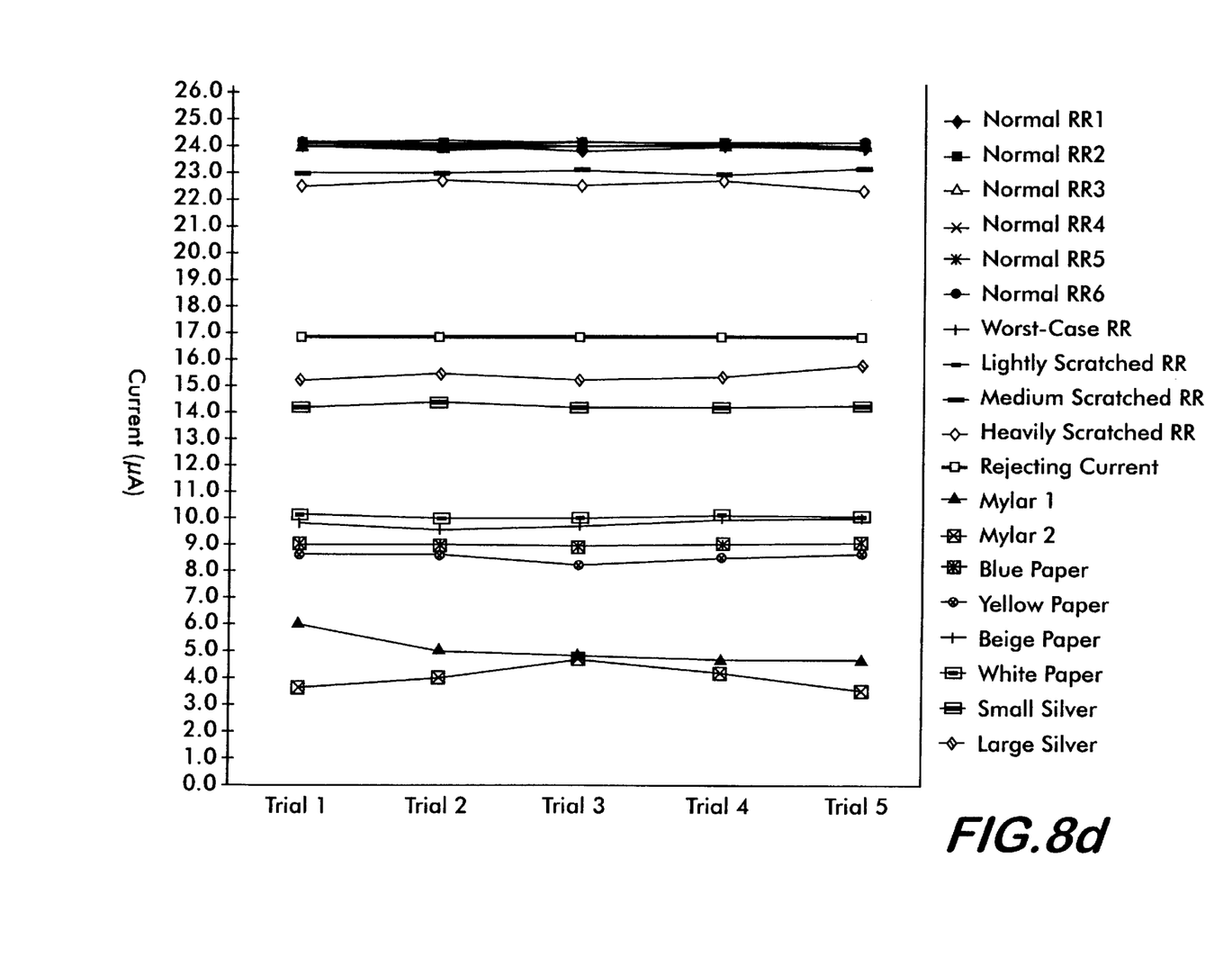

The test disks utilized to generate the noted data included six disks equipped with "normal" retro-reflectors (the notation "RR" is used in the FIGS. 8c and 8d as an abbreviation for retro-reflective marker). These particular retro-reflective markers possessed reflectivities that were relatively close the nominal value for production markers. The "worst-case marker" was a production marker having a marginally-acceptable reflectivity. The "scratched" series of markers consisted of retro-reflective markers whose surfaces were intentionally scratched in various degrees of severity.

The remainder of the test disks referred to in FIGS. 8c and 8d did not comprise retro-reflective markers. These disks simulated the reflective characteristics of various objects commonly inserted into disk drives. Specifically, the "blue," "yellow," "beige," and "white" test disks were each equipped with a paper strip corresponding to the noted color. These strips simulated the reflective characteristics of various 1.44 MB floppy disks, which are commonly available in such colors. The "mylar" test disks were each equipped with a strip of mylar to simulate an object having a relatively high surface reflectivity. A strip of aluminum-coated tape was affixed to each of the "silver" test disks. This tape simulated the reflective characteristics of the brushed-aluminum shutters commonly employed on 1.44 MB floppy disks. The "small silver" disk comprised a strip of tape cut into the shape of a retro-reflective marker. The "large silver" disk was equipped with a larger strip that approximated the size of the noted floppy-disk shutter.

The referenced data indicates that, under the specified conditions, detector 22 registered a relatively high output in response to disks equipped with retro-reflective markers. Conversely, the response of detector 22 to various foreign objects was substantially (and consistently) lower. More specifically, with y set at about 30 degrees (thereby matching pitch angle α), a substantially higher amount of light was reflected back toward detector 22 by the disks equipped with retro-reflective markers than by the other test disks. This clearly-defined delineation allows the disk-activation threshold (discussed more fully below) to be set at a level that facilitates activation of drive 18 in the presence of retro-reflector-equipped cartridges, but prevents activation in the presence of most objects unsuitable for use in the drive. For example, a system that incorporates the activation threshold denoted in FIG. 8d (represented as "rejection current") will allow activation of drive 18 in the presence of all of the noted retro-reflective markers 11. Conversely, the system will not allow activation in the presence of objects whose surfaces exhibit the reflective characteristics of the other materials listed in the figure.

Emitter/detector pair 21, 22 is preferably disposed on a printed circuit board (PCB) 24. PCB 24 is preferably connected to disk drive 18, with emitter 21 and detector 22 emitting and detecting light through slots in the chassis of drive 18. In a preferred embodiment, emitter/detector pair 21, 22 comprises a baffle (not shown in the figures) disposed between surfaces 21a and 22a. The baffle is describe in a commonly assigned, co-pending U.S. patent application Ser. No. 08/931,272, filed on Sep. 15, 1997 and entitled "An Improved Disk Drive For Detecting A Retroreflective Marker On A Data Storage Cartridge." This application is hereby incorporated by reference.

Figure 9:
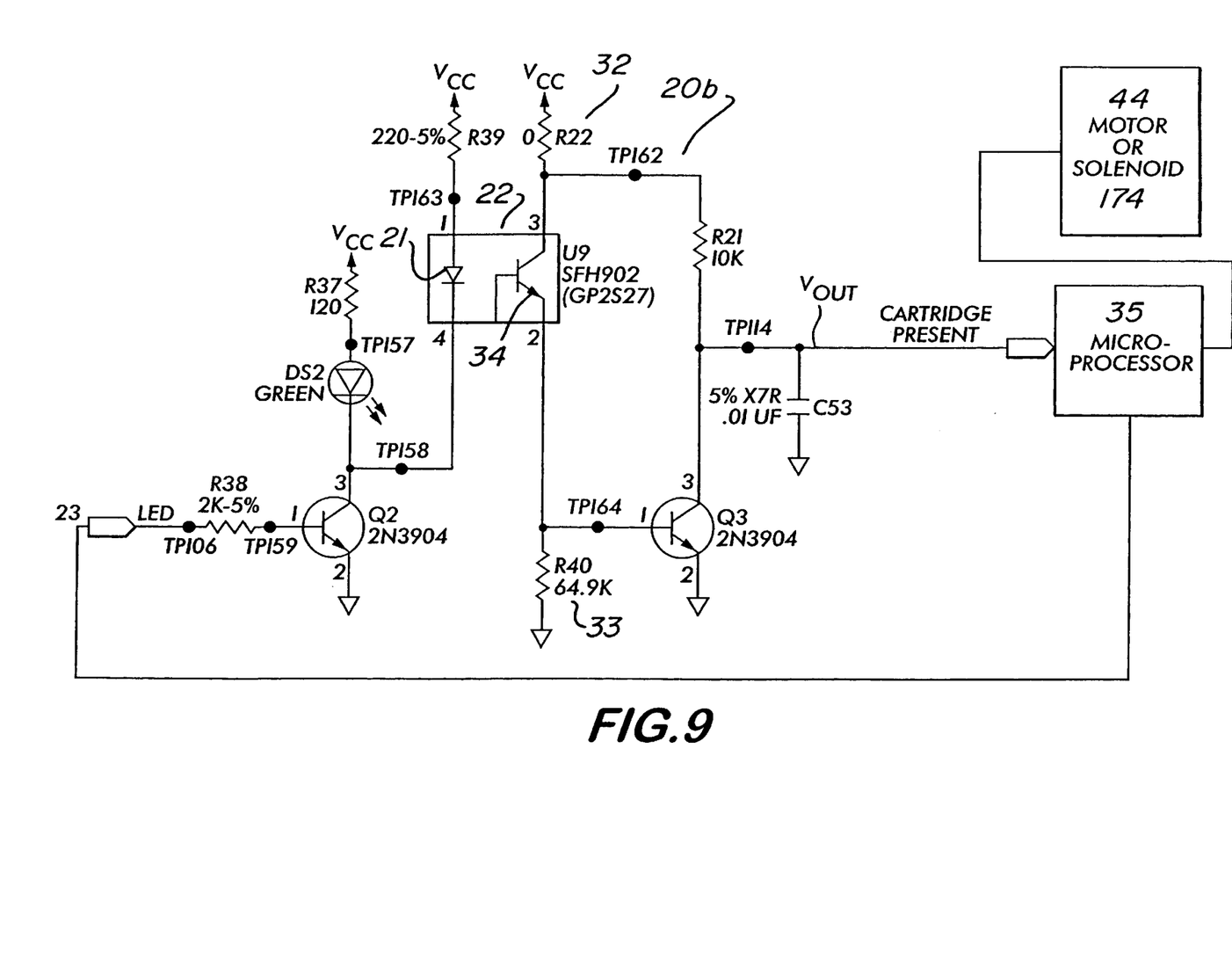
FIG. 9 illustrates an electrical circuit that controls the activation of the read/write heads of the disk drive shown in FIG. 6.

Detector 22 is part of electrical circuit 20b that is used to control the operation of disk-drive heads 61, as illustrated in FIG. 9. As explained in detail below, if detector 22 detects a proper disk cartridge 10, circuit 20b sends a signal to permit disk-drive heads 61 to interface with data-storage cartridge 10. If a proper cartridge 10 is not detected, heads 61 are restrained from interfacing with the inserted cartridge as described below. This protects the disk drive against the use of improper data cartridges, and from recording to write-protected cartridges.

Electrical circuit 20b includes a voltage source ($V_{cc}$), an output voltage ($V_{out}$), detector 22, a limiting resistor 32 that limits the voltage of detector 22, and a resistor 33 disposed between detector 22 and ground. $V_{OUT}$ is directed to a microprocessor 35. When $V_{out}$ reaches a pre-determined threshold, microprocessor 35 permits disk-drive heads 61 to move and to thus interface with disk cartridge 10. Otherwise, heads 61 remain in the retracted position.

If a data-storage cartridge that does not have a retro-reflective marker 11 is inserted into disk drive 18, $V_{out}$ will generally remain outside of a predetermined range of values under which microprocessor 35 will permit activation of heads 61. When a cartridge 10 comprising marker 11 is inserted in drive 18, emitter 21 and detector 22 become optically coupled via the refection from marker 11. This coupling causes the amount of electrical current conducted by detector 22 to vary in proportion to the increase in the amount of radiant energy striking light-receiving surface 22a. Detector 22 also causes a transistor 34 to conduct current under these conditions. This conduction by detector 22 and transistor 34 causes $V_{out}$ to cross into a range of values under which microprocessor 35 will permit activation of heads 61.

Limiting resistor 32 preferably has a resistance of 10K-ohms with a tolerance of +/−5%. Transistor 34 is a 2N3904 transistor having a +/−50% tolerance on its Beta. Emitter/detector pair 21, 22 has a 2:1 range for photo transistor output current given a particular reflective target. The optical elements in marker 11 have a maximum variance range of about 20% in their reflective efficiency.

Head retraction system 42 of disk drive 18 includes a motor 44, a head crank 54, a drive link 48, a trolley 50, a linear actuator 52, and a head spring 78. These components operate in conjunction to hold heads 61 in a parked position when a suitable disk cartridge 10 has not been inserted into disk drive 18. Linear actuator 52 is mounted within disk drive 18 so that actuator 52 can move linearly, in a direction approximately parallel to the chassis. Actuator 52 includes a carriage assembly 56, a load beam 58, a head gimbal assembly (not shown), and heads 61. Load beam 58 is preferably welded to the head gimbal assembly, and heads 61 are mounted on an end of the assembly. Load beam 58, the head gimbal assembly, and heads 61 are all mounted on carriage assembly 56. Carriage assembly 56 is translatably mounted in disk drive 18. Specifically, the assembly is free to translate toward the front and the back of the drive. Carriage assembly 56 has a post 69 which is engaged by trolley 50.

Head crank 54 is coupled to motor 44 by a gearing system. The gearing system transmits power from motor 44 to power head crank 54. Head crank 54 is connected to drive link 48 by a wire 68 or a similar device. Drive link 48 is rotatably mounted to disk drive 18. Wire 68 and head spring 78 are attached to opposite longitudinal ends of drive link 48.

Rotation of head crank 54 results in the application of a torque on drive link 48 which exceeds the countering torque exerted by head spring 78. The resulting rotation of drive link 48 causes trolley 50, carriage assembly 56, and heads 61 to translate forward.

Thus, in order to move heads 61 forward to interface with disk cartridge 10 upon its insertion, power must be applied to motor 44. Power to motor 44 is controlled by microprocessor 35 and electrical circuit 20b as described above. When data-storage cartridge 10 is inserted into disk drive 18, emitter 21 is activated and begins to emit irradiance. If cartridge 10 has a reflective marker 11, the irradiance is reflected back toward detector 22. Hence, the presence of cartridge 10 is noted by detector 22 and electrical circuit 20b. Electrical circuit 20b then sends a signal to microprocessor 35, which causes motor 44 to rotate. The rotation of motor 44 causes a forward movement of trolley 50 into a position that allows heads 61 to interface with data-storage cartridge 10.

In contrast, if an incompatible data-storage cartridge is inserted, microprocessor 35 will not power motor 44. Consequently, trolley 50 will not move, and the movement of heads 61 is prevented. Thus, heads 61 cannot interface with data-storage cartridge 10, and damage to disk drive 18 from operating with an incompatible data-storage cartridge is avoided.

Figure 10:
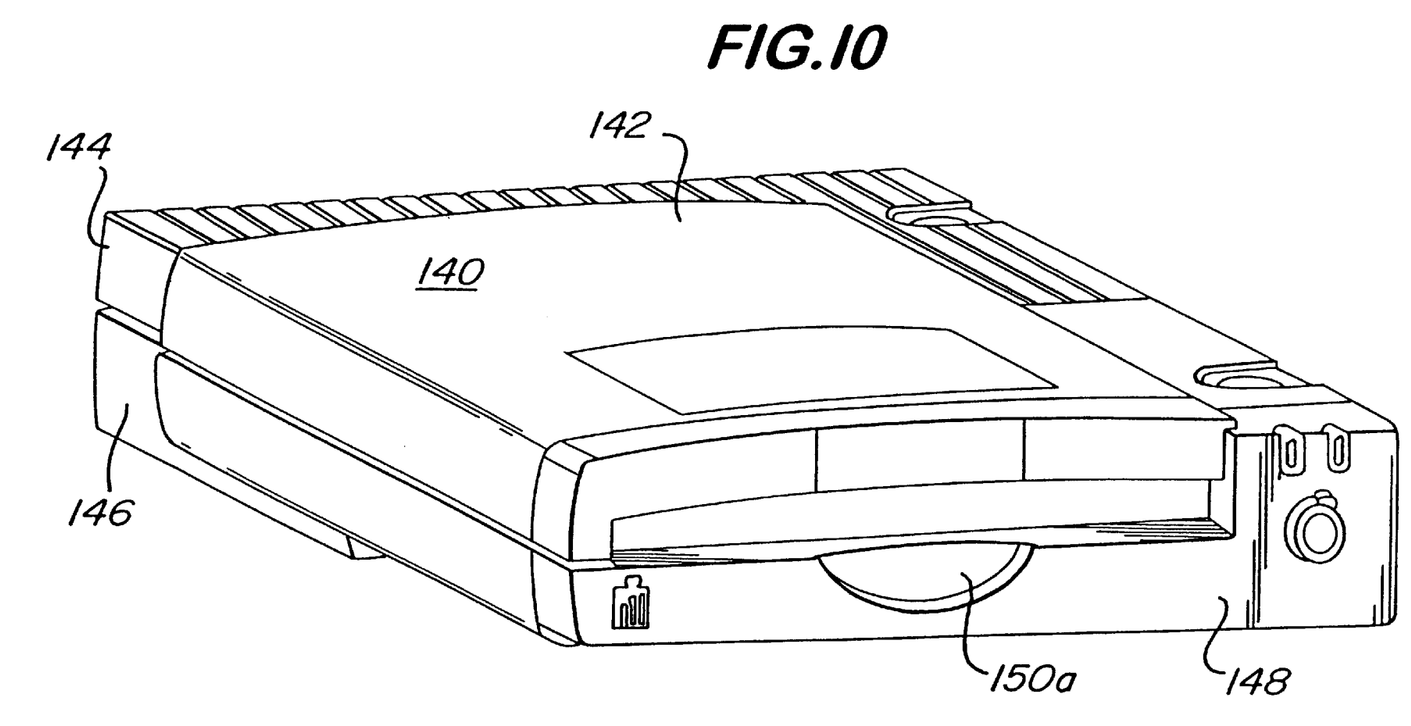
FIG. 10 is an isometric view of a disk drive of the type in which the invention can be used.
Figure 11:
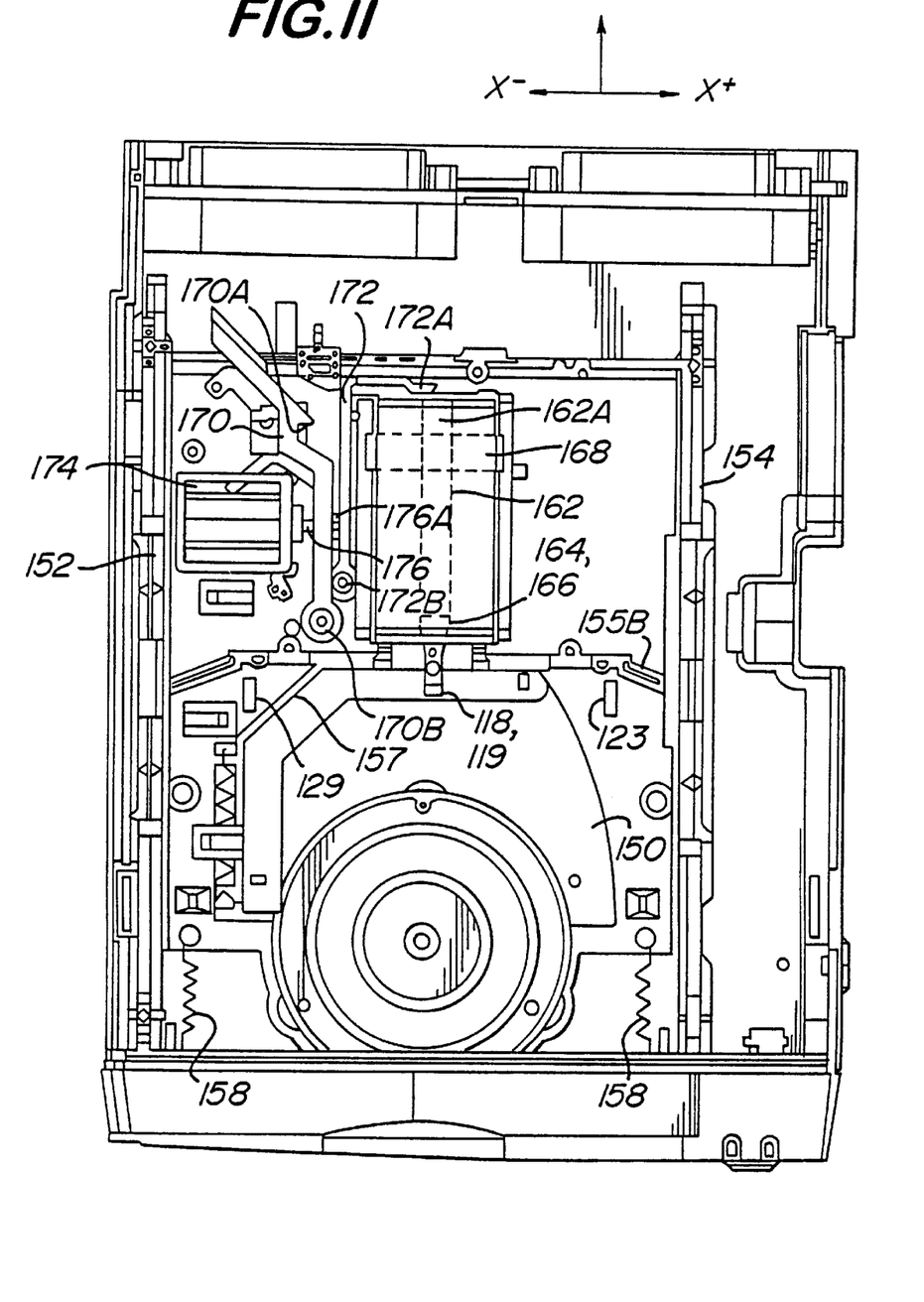
FIG. 11 is a top plan view of the disk drive of FIG. 10.

In another preferred embodiment of the invention, electrical circuit 20b, emitter 21, and detector 22 are disposed within a disk drive 140 as illustrated in FIGS. 10 and 11. The heads in this disk drive operate in a slightly different manner those in drive 18. However, in both embodiments emitter 21, detector 22, and electrical circuit 20b either permit or prevent movement of the heads, depending on whether a suitable disk cartridge 10 has been inserted into the drive.

Disk drive 140 comprises an outer housing 142 having top and bottom covers 144, 146, and a front panel 148. Cartridge 10 can be inserted into drive 140 through a horizontal opening 150a in front panel 148. Disk drive 140 comprises an internal platform 150 that slides on opposing rails 152, 154 between a forward position and a rearward position. A pair of springs 156, 158 biases platform 150 in its forward position.

A linear actuator is mounted on the rear of platform 150. The linear actuator comprises a carriage assembly 162 having two lightweight flexible arms 164, 166. Recording heads 118, 119 are mounted at the ends of the respective arms 164, 166. A coil 168, which is part of a voice-coil motor, is mounted at the opposite end of carriage 162. Coil 168 interacts with magnets (not shown) to move the carriage linearly so that recording heads 118 and 119 can move radially over the recording surface of cartridge 10.

A head-locking lever 172 is also pivotally mounted on platform 150 about a rotation shaft 172b. A second spring (not shown) is coupled to lever 172 at its rotation shaft 172b to bias lever 172 in the X+ direction. An end 172a of lever 172, which extends at a right angle to the main shaft of the lever, is adapted to releasably engage an end 162a of actuator carriage 162 when the carriage is in a fully retracted position, thereby locking carriage 162 in place and preventing inadvertent movement of recording heads 118, 119.

Disk drive 140 also contains a solenoid 174 equipped with a drive shaft 176. When solenoid 174 is energized by an electrical current, drive shaft 176 moves in the X+ direction, away from its normally extended position and toward a retracted position. As drive shaft 176 moves toward its retracted position, an enlarged operating end 176a of drive shaft 176 engages head locking levers 170, 172 in order to pull the levers in the X+ direction, against their normal spring bias. Movement of lever 172 in the X+ direction causes end 172a of the lever to disengage from end 162a of carriage 162, thereby unlocking actuator carriage 162 and allowing the carriage to move radially in relation to recording medium 13. Similarly, movement of lever 170 in the X+ direction causes a cutout 170a on the lever to disengage from latch projection 178, thereby releasing platform 150 and allowing platform 150 to return to its forward position.

Electrical circuit 20b is coupled to solenoid 174. Emitter 21, detector 22, and electrical circuit 20b operate as described above with regard to the first embodiment, and determine whether a compatible data-storage cartridge, i.e., a cartridge with a retro-reflective marker 11, has been inserted. If such a cartridge has been inserted, electrical circuit 20b will cause solenoid 174 to be powered. Solenoid 174 will then operate as described above to unlock heads 118, 119, thereby permitting the heads to move and interface with cartridge 10.

It is to be understood that, even though numerous characteristics and advantages of the present invention have been set forth in the foregoing description, together with details of the structure and function of the invention, this disclosure is illustrative only. Changes may be made to detail, especially in matters of shape, size, and arrangement of parts within the principles of the invention, to the full extent indicated by the broad general meaning of the terms in which the appended claims are expressed.

What is claimed is:

1. A data-storage system comprising:
   (a) a disk drive of the type that receives a removable data-storage cartridge, comprising:
      (1) a source of irradiance disposed within said disk drive, said source of irradiance comprising an emitting surface, said emitting surface being disposed in a first plane within said disk drive; and
      (2) a detector of irradiance disposed within said disk drive, said detector of irradiance comprising a receiving surface, said receiving surface being disposed in a second plane within said disk drive; and
   (b) said removable data-storage cartridge, said cartridge comprising an exterior surface and a retro-reflective marker comprising a plurality of reflective panels said reflective panels being disposed in planes that form a pitch angle with a back surface of said marker, said reflective marker being disposed along said exterior surface of said cartridge, said exterior surface of said cartridge being disposed in a third plane within said disk drive when said cartridge is inserted in said disk drive, said third plane being disposed at acute angles with said first plane and said second plane and said angle between said first plane and said third plane being about equal to said pitch angle of said reflective panels, said reflective marker being in optical communication with said source of irradiance and said detector when said cartridge is inserted in said disk drive.

2. The data-storage system of claim 1, wherein said angle between said second plane and said third plane is about equal to said pitch angle of said reflective panels.

3. The data-storage system of claim 2, wherein said pitch angle is about 30 degrees.

4. The data-storage system of claim 1, wherein said pitch angle is about 30 degrees.

5. The data-storage system of claim 1, wherein a distance between said reflective marker and said emitting surface is about 10 mm.

6. The data-storage system of claim 1, wherein a distance between said reflective marker and said receiving surface is about 10 mm.

7. The data-storage system of claim 1, wherein said disk drive farther comprises a circuit board on which said source of irradiance and said detector are disposed.

8. The data-storage system of claim 1, wherein said disk drive further comprises a housing that encloses said source of irradiance and said detector.

9. The data-storage system of claim 1, wherein said source of irradiance further comprises a light-emitting diode.

10. The data-storage system of claim 1, wherein said disk drive further comprises read/write heads for interfacing with said data-storage cartridge.

11. The data-storage system of claim 10, wherein said disk drive further comprises an electrical circuit that controls the operation of said read/write heads.

12. The data-storage system of claim 1, wherein said source of irradiance further comprises a light-emitting diode.

13. The data-storage system of claim 1, wherein said disk drive further comprises an actuator.

14. The data-storage system of claim 13, wherein said disk drive further comprises an electrical circuit, said electrical circuit being responsive to said detector to enable said actuator when said detector senses light reflected from said reflective marker above a predetermined level.

15. A disk drive of the type that receives a removable data-storage cartridge, said data-storage cartridge comprising an external surface and a retro-reflective marker, said external surface being disposed in a first plane within said disk drive when said cartridge is inserted in said disk drive, said marker comprising a plurality of reflective panels being disposed at a pitch angle in relation to a back surface of said marker, said disk drive comprising:

a source of irradiance comprising an emitting surface, said emitting surface being disposed in a second plane within said disk drive, said second plane forming an angle with said first plane that is about equal to said pitch angle; and a detector of irradiance being in selective optical communication with said source of irradiance and comprising a receiving surface, said receiving surface being disposed in a third plane within said disk drive, said third plane forming an angle with said first plane that is about equal to said pitch angle.

16. A data-storage system comprising:

(a) a disk drive of the type that receives a removable data-storage cartridge, comprising:

(1) a source of irradiance disposed within said disk drive, said source of irradiance comprising an emitting surface, said emitting surface being disposed in a first plane within said disk drive; and (2) a detector of irradiance disposed within said disk drive, said detector of irradiance comprising a receiving surface, said receiving surface being disposed in a second plane within said disk drive; and (b) said removable data-storage cartridge, said cartridge comprising an exterior surface and a retro-reflective marker comprising a plurality of reflective panels, said reflective panels being disposed in planes that form a pitch angle with a back surface of said marker, said reflective marker being disposed along said exterior surface of said cartridge, said exterior surface of said cartridge being disposed in a third plane within said disk drive when said cartridge is inserted in said disk drive, said third plane being disposed at acute angles with said first plane and said second plane and said angle between said second plane and said third plane being about equal to said pitch angle of said reflective panels, said reflective marker being in optical communication with said source of irradiance and said detector when said cartridge is inserted in said disk drive.

* * * * *

UNITED STATES PATENT AND TRADEMARK OFFICE
CERTIFICATE OF CORRECTION

PATENT NO. : 6,297,923 B1　　　　　　　　　　　　　　　　　　　　　　Page 1 of 1
DATED : October 2, 2001
INVENTOR(S) : Michael C. Burnside et al.

It is certified that error appears in the above-identified patent and that said Letters Patent is hereby corrected as shown below:

Column 5,
Line 60, change "angley" to -angle -- $\gamma$ --.

Column 7,
Line 30, change "y" after "with" to -- $\gamma$ --

Signed and Sealed this

Fifth Day of March, 2002

*Attest:*

JAMES E. ROGAN
*Attesting Officer*　　　Director of the United States Patent and Trademark Office